R. H. WHITE.
TRACK LAYING TRACTOR.
APPLICATION FILED MAY 1, 1919.
1,326,703.
Patented Dec. 30, 1919.
2 SHEETS—SHEET 1.
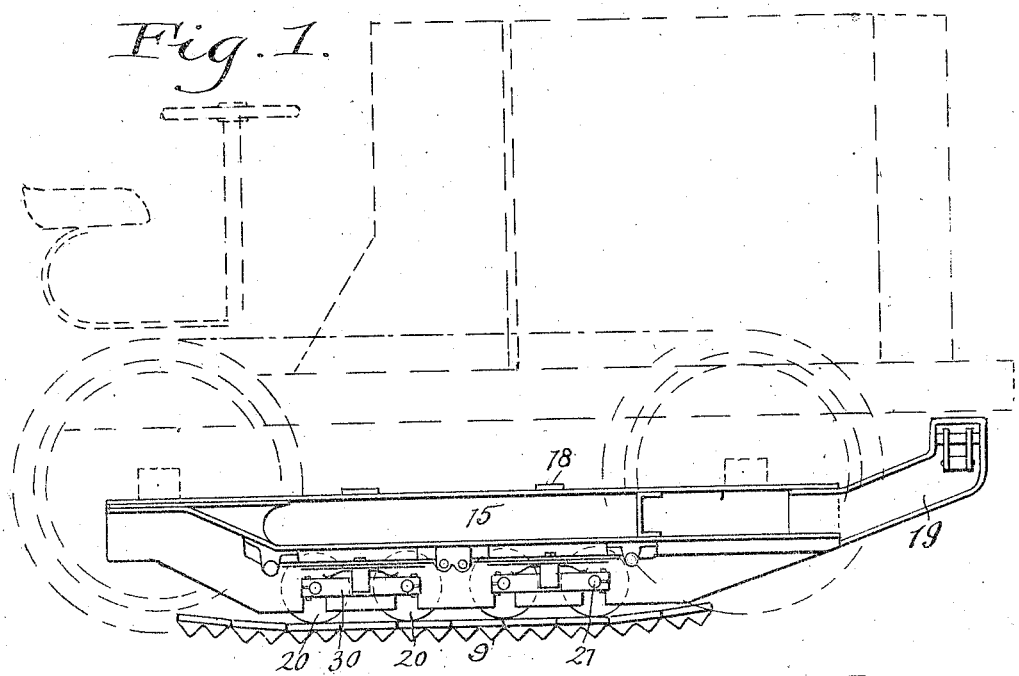
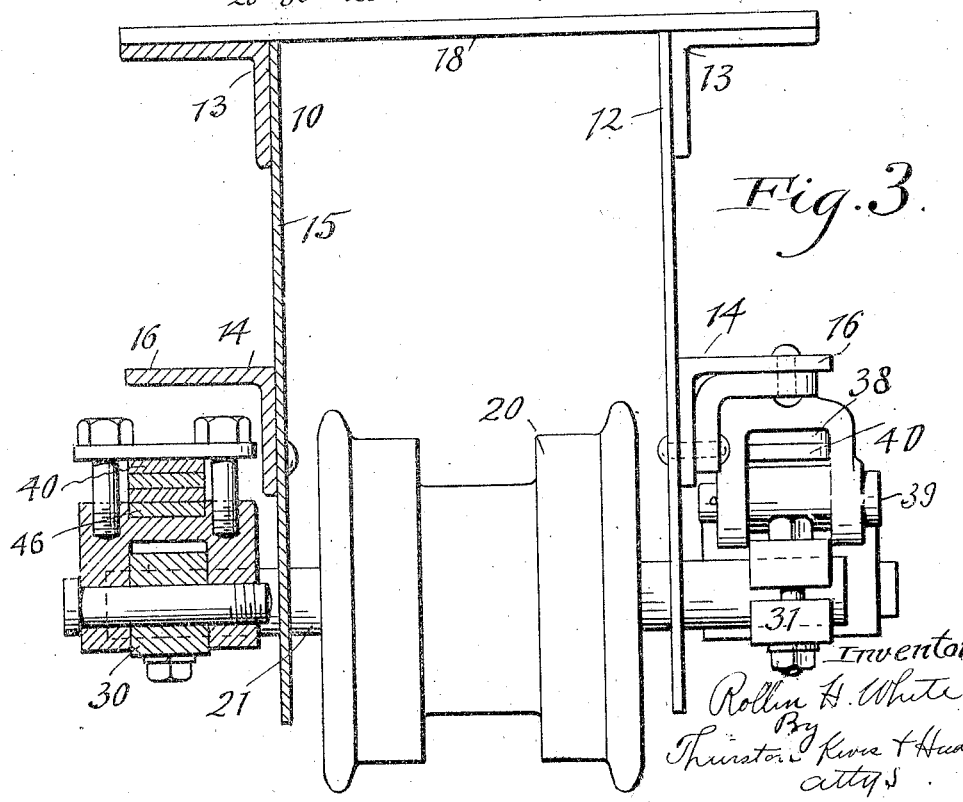
Inventor:
Rollin H. White
By Thurston, Rives & Hudson
attys

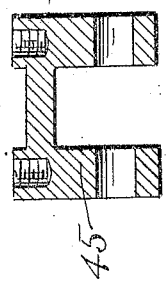
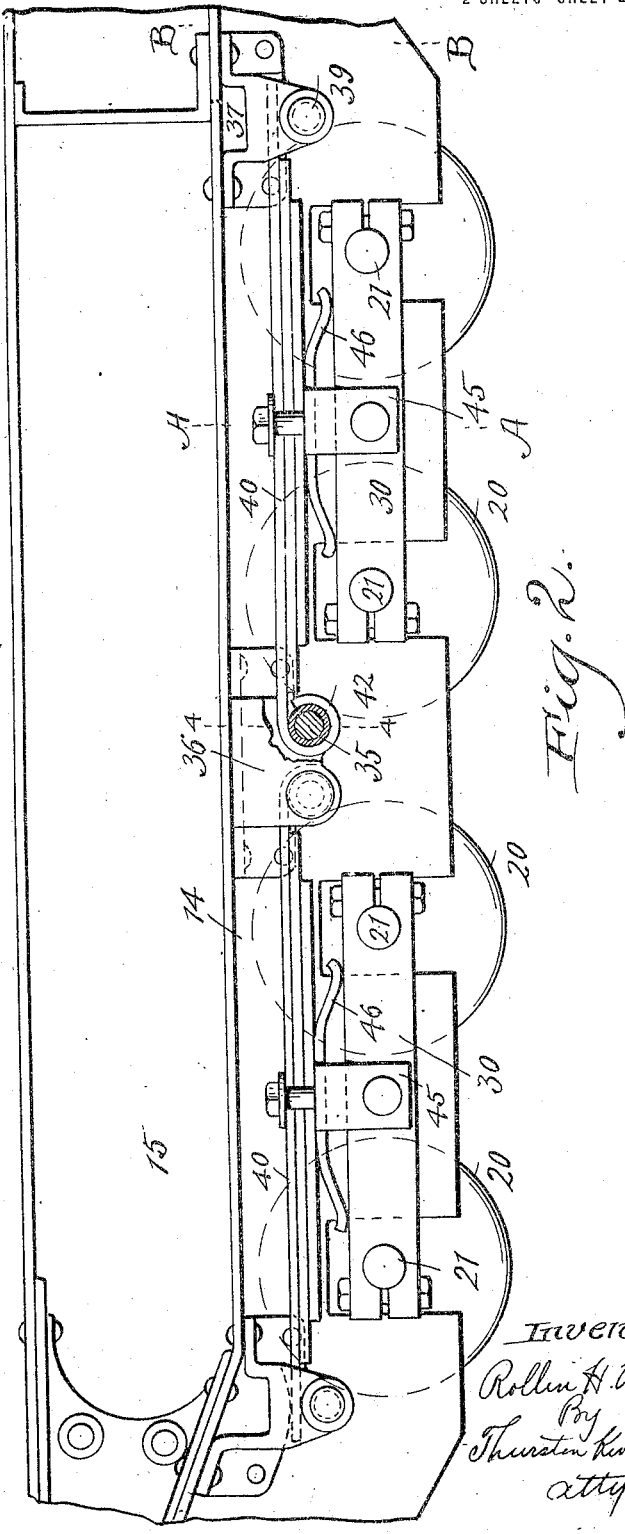

UNITED STATES PATENT OFFICE.

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

TRACK-LAYING TRACTOR.

1,326,703.

Specification of Letters Patent.

Patented Dec. 30, 1919.

Application filed May 1, 1919. Serial No. 293,969.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Track-Laying Tractors, of which the following is a full, clear, and exact description.

This invention relates to the means for mounting the track wheels on the truck of a track laying tractor. The object is to enable all the track wheels to simultaneously engage the track, however unevenly the latter may lie as the result of unevenness of the ground upon which it is laid, and to cause each track wheel to yieldingly support its share of the load; or in other words, to distribute the supported load with substantial uniformity over the entire ground reach of the track through said track wheels.

It is the further object of the invention to effect the stated results by means which are not prohibitively expensive, which may be durable and which may be easily and quickly assembled and disassembled when necessary.

The invention consists in the construction and combination of parts shown in the drawing and hereinafter described and definitely pointed out in the appended claims.

In the drawings, Figure 1 is a side elevation of so much of the track laying tractor as is necessary to fully disclose the present invention; Fig. 2 is a side elevation enlarged, of a part of one of the truck frames; Fig. 3 is a transverse section through one of the truck frames, the section at one side being in the plane indicated by line A—A on Fig. 2, and the other end in the plane indicated by line B—B on Fig. 2. Fig. 4 is a vertical transverse section on line 4—4 on Fig. 2 through one side of a truck frame; and Fig. 5 is a detached sectional view of one of the U-shaped clips 45.

Referring to the parts by reference characters, 10 and 12 represent the two spaced-apart side beams of the truck or track frame of a track laying tractor. The invention is shown in connection with substantially such a track laying tractor as is shown in the White Patent No. 1,253,319, in which the rear ends of the truck or track frame are pivotally connected with the main frame of the tractor, and a spring suspension is interposed between the front end of said trucks or truck frames and the main frame. The invention, however, is applicable to the trucks of a track laying tractor regardless of the particular means, connecting the trucks and the main frame, through which the weight of the main frame is transmitted to the truck.

In the construction shown each side frame member 10 is composed of an upper angle bar tension member 13, and a bent lower angle bar compression member 14, and a guard plate 15 to the outer face of which the two vertical webs of the two angle bars are riveted, whereby the horizontal webs of the angle bars extend away from the guard plate, as flanges 16. The two side beams of each truck frame are connected together in spaced parallel relation by suitable means, as for example, cross bars 18, and a yoke 19, such as shown in said prior patent, which connects their front ends.

Associated with each truck is any desired number of pairs of truck wheels 20 for engagement with the track 9. Usually it is customary to employ two and only two pairs of such truck wheels. Each pair of truck wheels may be mounted on the truck by the same mechanism substantially as shown, as follows:

The wheels 20 lie between the two truck beams 10, 12, and they are rotatably mounted on transversely extended shafts 21, which shafts extend through ample holes in the two guard plates 15. The ends of the front shaft are secured to the front ends of two rocker bars 30, 31, which are located adjacent the outside faces of the two beams 10, 12, by which they are respectively supported, while the ends of the rear shaft are connected with the rear end of the same two bars. The supporting means for each rocker bar include a leaf spring 40, which lies outside of and is associated with one of the track beams. Each leaf spring is preferably made of a plurality of flat leaves; the upper or master leaf has at one end an eye 42 which embraces a pin 35 that is carried by an inverted U-shaped bracket 36 which is riveted to the outside face of the adjacent truck beam,—the said eye lying between the two ears of said bracket. An inverted U-shaped bracket 37 is also riveted to the outer face of said truck beam near the other end of the leaf spring. This bracket has a curved spring seat 38 and below that a transverse pin 39. The leaf spring, or rather, preferably the master leaf thereof, goes between the spring seat and the pin, and has a load supporting sliding engagement with the spring seat; and said spring also passes between the two ears of the U-shaped bracket. The shaft carrying rocker bars 30, are respectively connected at or very near their middle points with the two leaf springs midway between the supported ends thereof. In the best construction this connection is a pivotal connection. To get this pivotal connection an inverted U-shaped bracket 45 is clipped to the leaf spring and lies below it. The adjacent bar 30 lies between the two ears of the bracket and is pivoted to them. To yieldingly control the rocking of the bars 30 upon their pivots, a spring leaf 46 is provided for each. At its middle part it is clamped between the bracket 45 and leaf spring, and its ends are bent down so that they yieldingly press upon the top of the bar near its ends.

The foregoing description relates to one pair of truck wheels and associated parts; but it will be understood that other pairs of truck wheels may be similarly connected with the truck frames. The truck wheels, whether there be one or more pairs, will automatically follow the sinuosities of a track which is laid on uneven ground, and the weight of the supported load will be yieldingly transmitted with substantial uniformity to the tracks through all of the truck wheels.

Having described my invention, I claim:—

1. In a track laying tractor, the combination of a truck frame having two spaced apart side beams, two shafts which extend transversely through both side beams, and track wheels rotatably mounted on said shafts between said truck beams, with the following mechanism located on each side of the truck frame adjacent the outside faces of the side beams thereof, viz: a longitudinally extended leaf spring, supports for the ends thereof carried by the adjacent side beams, a longitudinally extended bar which is located below said leaf spring, means connecting the middle part of said bar with the middle part of said leaf spring,—one of said shafts being connected with the front ends of the two bars and one with the rear ends of the two bars.

2. In a track laying tractor, the combination of a truck frame having two spaced apart side beams, two shafts which extend transversely through both side beams, and track wheels rotatably mounted on said shafts between said truck beams, with the following mechanism located on each side of the truck frame adjacent the outside faces of the side beams thereof, viz: a longitudinally extended leaf spring, supports for the end thereof carried by the adjacent side beams, a longitudinally extended bar which is located below said leaf spring, a bracket secured to the middle part of said leaf spring, a pivotal connection between said bar and bracket, one of said shafts being connected with the front ends of the two bars and one with the rear ends of the two bars.

3. In a track laying tractor, the combination of a truck frame having two spaced apart side beams, two shafts which extend transversely through both side beams, and track wheels rotatably mounted on said shafts between said truck beams, with the following mechanism located on each side of the truck frame adjacent the outside faces of the side beams thereof, viz: a longitudinally extended leaf spring, supports for the end thereof carried by the adjacent side beams, a longitudinally extended bar which is located below said leaf spring, a bracket secured to the middle part of said leaf spring, a pivotal connection between said bar and bracket, a spring leaf engaging said bar on opposite sides of its pivot, one of said shafts being connected with the front ends of the two bars, and one with the rear ends of said two bars.

4. In a track laying tractor, the combination of a truck frame having two spaced apart side beams, two shafts which extend transversely through both side beams, and track wheels rotatably mounted on said shafts between said truck beams, with the following mechanism located on each side of the truck frame adjacent the outside faces of the side beams thereof, viz: a longitudinally extended leaf spring having an eye at one end, a bracket fixed to the adjacent truck beam having a pin which rotatably fits within said eye, a second bracket fixed to said truck beam carrying a spring seat which overlies and engages said leaf spring near its other end, a pin carried by said bracket extending beneath the spring seat and spring, a bracket which is secured to the leaf spring near its middle and extended downward therefrom, and a rocker bar which is pivoted to the last named bracket,— one of said shafts being connected with the front ends of said two rocker bars and one with the rear ends of said rocker bars.

5. In a track laying tractor, the combination of a truck frame having two spaced apart side beams, two shafts which extend transversely through both side beams and track wheels rotatably mounted on said shafts between said truck beams with the following mechanism located on each side of the truck frame adjacent the outside faces of the side beams thereof, viz: a longitudinally extended leaf spring, an inverted U-shaped bracket fixed to the side beam and having a pin which is rotatably mounted in the eye of said leaf spring, a second inverted U-shaped bracket fixed to the side beam, the ears of which embrace the opposite end of said leaf spring, there being a spring seat in said bracket between the two ears thereof which spring seat overlies and engages the leaf spring, a pin extending between the ears of said bracket beneath the leaf spring, an inverted U-shaped bracket clipped to the lower side of the leaf spring near the middle thereof, a rocker bar which extends between the two ears of the last named bracket and is pivoted thereto, a spring leaf clamp between said bracket and leaf spring for engaging the rocker bar on opposite sides of its pivot,—one of said shafts being connected with the front ends of both rocker bars and one being connected with the rear ends of both rocker bars.

In testimony whereof I hereunto affix my signature.

ROLLIN H. WHITE.